(12) United States Patent
Krahe et al.

(10) Patent No.: US 6,369,563 B1
(45) Date of Patent: Apr. 9, 2002

(54) METHOD FOR HIGH RESOLUTION MEASUREMENT OF A POSITION

(75) Inventors: Frank Krahe; Eckart Garneyer, both of Ludenscheid (DE)

(73) Assignee: MTS Systems Corporation, Eden Prairie, MN (US)

( * ) Notice: Subject to any disclaimer, the term of this patent is extended or adjusted under 35 U.S.C. 154(b) by 0 days.

(21) Appl. No.: 09/125,334
(22) PCT Filed: Dec. 19, 1996
(86) PCT No.: PCT/US96/20715
§ 371 Date: Nov. 23, 1998
§ 102(e) Date: Nov. 23, 1998
(87) PCT Pub. No.: WO98/27401
PCT Pub. Date: Jun. 25, 1998
(51) Int. Cl.[7] .................................................. G01B 7/14
(52) U.S. Cl. .............................. 324/207.13; 324/207.24
(58) Field of Search ....................... 324/207.13, 207.24; 318/592, 594; 73/313, 314; 377/17

(56) References Cited

U.S. PATENT DOCUMENTS 3,778,833 A * 12/1973 Castrovillo et al. ......... 318/594
4,319,189 A * 3/1982 Cullum, Jr. et al. ..... 324/207.13
5,258,707 A 11/1993 Begin et al.
5,317,520 A 5/1994 Castle

FOREIGN PATENT DOCUMENTS

EP  0508232 A2 * 3/1992

* cited by examiner

Primary Examiner—Walter Snow
(74) Attorney, Agent, or Firm—David M. Ostfeld

(57) ABSTRACT

A magnetostrictive linear position sensor produces a signal which is a time period. It is sometimes required to measure this time period and produce an output in another form which accurately represents the time period. The final output may be a voltage, current, frequency, digital or other signal format. A time period is commonly measured using a clock and a counter. The resolution is limited by the frequency of the clock. An upper limit for the clock frequency is usually set based on power consumption or other circuit constraint. A method and apparatus is disclosed for improving the resolution of a time interval using low power and for providing a response after one time period without averaging.

10 Claims, 5 Drawing Sheets

METHOD FOR HIGH RESOLUTION MEASUREMENT OF A POSITION

BACKGROUND OF THE INVENTION

1. Field of the Invention

The present invention relates to devices to supply accurate time period information to position sensors which require the accurate measurement of a time period and the methods for accurately measuring such time periods at high resolution.

More particularly, the present invention relates to sensors based on the principle of magnetostriction which require accurate measurement of time periods and novel methods using magnetostrictive position sensors to make high resolution time period measurements without increased power requirements.

2. Description of the Prior Art

In general, magnetostrictive position sensors include a ferromagnetic delay line, which is occasionally called a "waveguide". A pulse generator supplies a current pulse to the delay line, generating a magnetic field which surrounds the delay line. A remote and movable position indicating magnet is positioned along the delay line. The magnetic field of the position magnet disturbs the magnetic field generated by the current pulse.

The interaction between the magnetic field of the position magnet and the magnetic field induced by the current pulse causes a strain or mechanical reaction within the delay line. This strain induced reaction force within the delay line is propagated along the length of the delay line as a torsional acoustic wave.

A detector, called a "mode converter", is typically attached to one end of the delay line. This mode converter detects the passage of the torsional acoustic wave and converts it into a representative electrical signal.

The time delay period from the excitation of the waveguide to the reception of the corresponding acoustic wave at the mode converter indicates the location of the position magnet along the length of the delay line.

A variety of time measurement or intervalometer techniques have been used to convert the time period information into a position indicating signal.

U.S. Pat. No. 3,898,555 to J. Tellerman discloses a fixed frequency oscillator to initiate the excitation pulses to the delay line. The returned acoustic signal, in conjunction with the fixed frequency oscillator, develops a signal which is "pulse width modulated" by the position of the magnet along the delay line. An integrator converts the pulse width modulated waveform to a DC voltage level which forms the transducer output.

U.S. Pat. No. 4,721,902 to J. Tellerman et al. discloses inter alia, a method to convert the pulse width modulated signal into a digital value. The patent teaches the use of a conversion counter to collect "counts" from a conversion oscillator during the "on" time of the pulse width modulated signal.

U.S. Pat. No. 5,070,485 to D. Nyce discloses an analog averaging technique to improve resolution at low power, but offers a much slower response time.

Magnetostrictive position sensors of this type are used in the measurement and control industry. They find use in machine tools, in robotics, as liquid level indicators, as well as other applications. In many of these applications, high speed and high resolution are both important.

In the prior art, simultaneous high speed and high resolution measurements for magnetostrictive sensors required a high power, high frequency clock ($\approx$100 Mhz). Thus, it would represent an advancement in the art to enable high resolution measurement without the need for high precision clocks.

It is also known in the art to use lower precision clocks to obtain higher precision time measurements. See EPO Application Serial No. 0508232A2.

SUMMARY OF THE INVENTION

In contrast to prior art magnetostrictive measurement systems, the present invention provides a novel method for measuring a time period for a magnetostrictive device or other time interval sensitive devices or other devices which may be arranged to be time interval sensitive, such as an RTD measuring device.

The method of this invention includes measuring a coarse count to approximate a time period to be measured using a low frequency clock (coarse clock) and measuring a fine count of the time period to be measured (ie., resolve the less significant bits) using a pulsed high frequency clock (fine clock). The fine count is then added to the coarse count to obtain a total high resolution representation of the time period.

The fine counter, clock or counting device does not have to be crystal controlled because its calibration is checked each time by comparing it to the coarse clock, which is crystal controlled. A crystal controlled clock typically requires settling time before it is accurate after being turned on. This method allows the fine counter to be easily cycled without turn-on settling.

The present invention also provides an apparatus for performing the method according to the present invention and includes means for measuring a coarse count, means for measuring a fine count and a means for summing the coarse and fine count and calculating a high resolution representation of the time period.

BRIEF SUMMARY OF THE DRAWINGS

For a further understanding of the nature and objects of the present invention and the features and advantages thereof, reference is now made to the Detailed Description in conjunction with the attached Drawings, in which like parts are given like reference numerals and wherein.

DETAILED DESCRIPTION OF THE PREFERRED EMBODIMENT OF THE INVENTION

The instant invention has been implemented in an application-specific integrated circuit (sometime abbreviated ASIC, herein) which also includes several additional novel features. Resistance measurements can be made using the same counting technique, combined with a capacitor charge/discharge scheme. The interrogation pulse generator has a programmable length. Registers are included for a noise rejection window and cycle time, more fully described in U.S. Pat. Nos. 4,721,902 and 5,311,124, incorporated herein by reference. Every measurement includes a scaling value relative to a crystal controlled clock.

Figure 1:
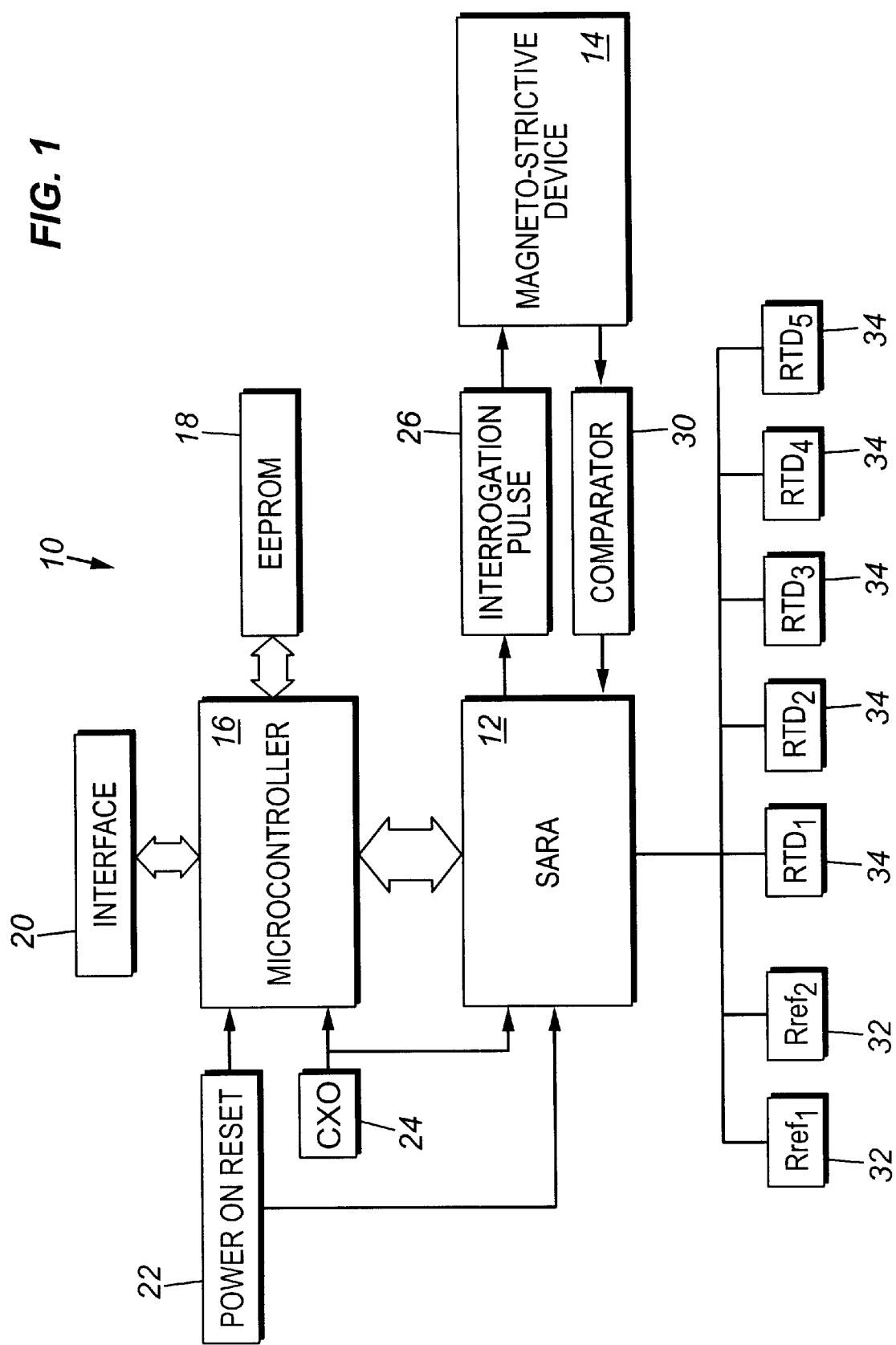
FIG. 1 is a block diagram of one preferred embodiment of a sensor of the present invention.

FIG. 1 shows a typical structure of a sensor device generally 10 including a sensor advanced running period acquisition system (sometimes abbreviated as a SARA system herein) 12, a magnetostrictive sensing element 14, a microcontroller 16, an EEPROM 18, an interface 20, a power on reset 22, a CXO 24, an interrogation pulse 26 passing from the SARA system 12 to the magnetostrictive device 14, a comparator 30 passing from the magnetostrictive device 14 to the SARA system 12, a set of temperature sensing reference devices 32, and a plurality of temperature sensing devices such as a resistive thermal device (sometimes referred to as RTDs) 34.

Figure 2:
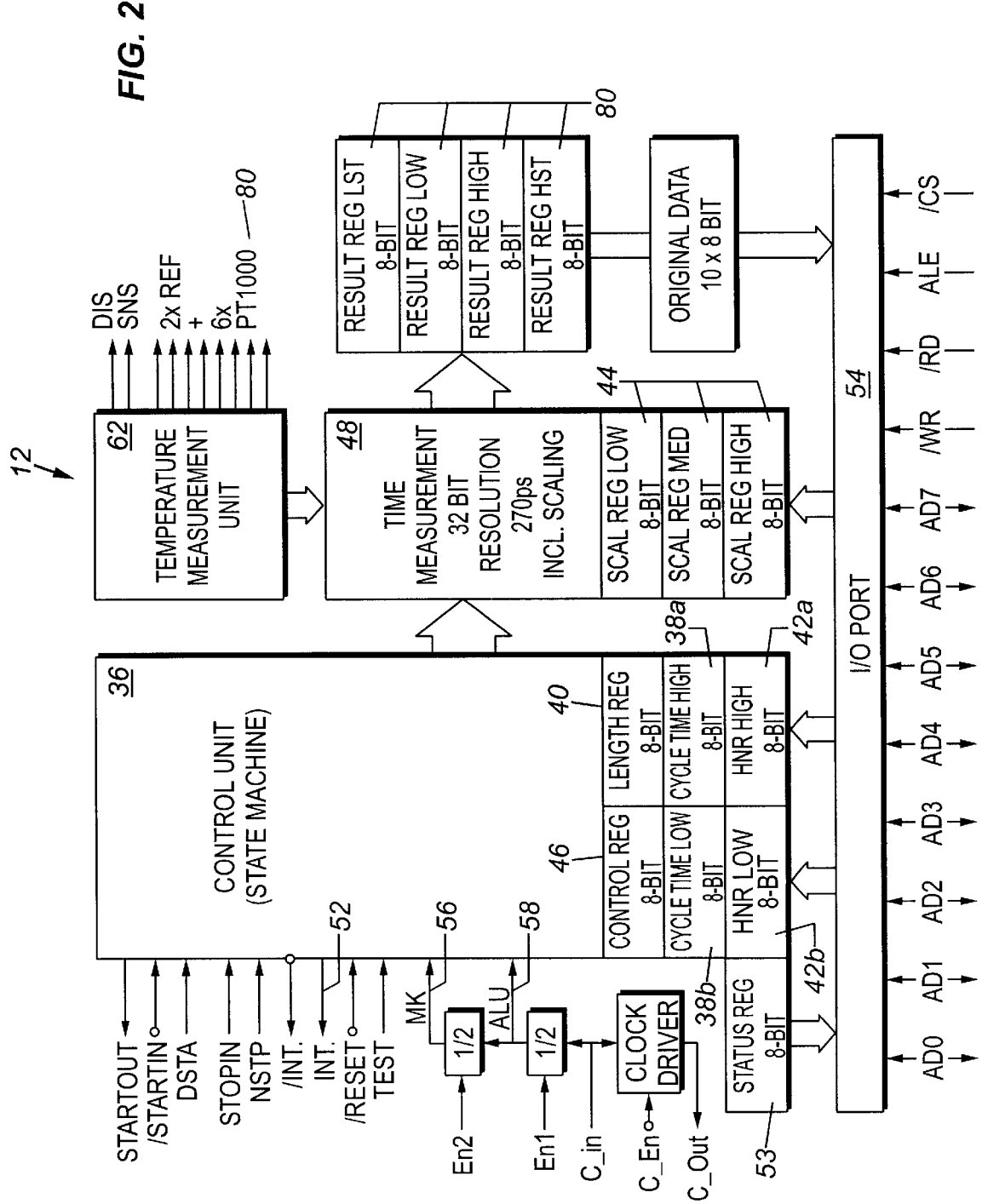
FIG. 2 is a schematic diagram of one preferred embodiment of an advanced running period acquisition system.

As shown in FIG. 2, the SARA system 12 includes a control unit 36 for controlling events and sequencing of devices communications. The SARA system 12 also includes a high and low cycle time, write only input registers 38a–b, a pulse length, write only input register 40, a high and low length, write only input registers 42a–b associated with a high noise rejection (HNR) window, scale factor, write only input registers 44 and control, write only input register 46.

The present method and device utilize a SARA system which includes a timing system having a fine clock that is an electronic circuit for measuring a short time interval in conjunction with a coarse clock for measuring a longer time interval. The values of these two clocks are then combined so that the coarse clock provides a whole number of counts and the fine clock provides the appropriate fraction of a whole number to yield a very accurate time interval. The course clock is a conventional clock such as a quartz clock, while the fine clock is described in European Application 0508232A2 as described fully herein.

Disclosure of European Application No. 0508232A2

Figure 4:
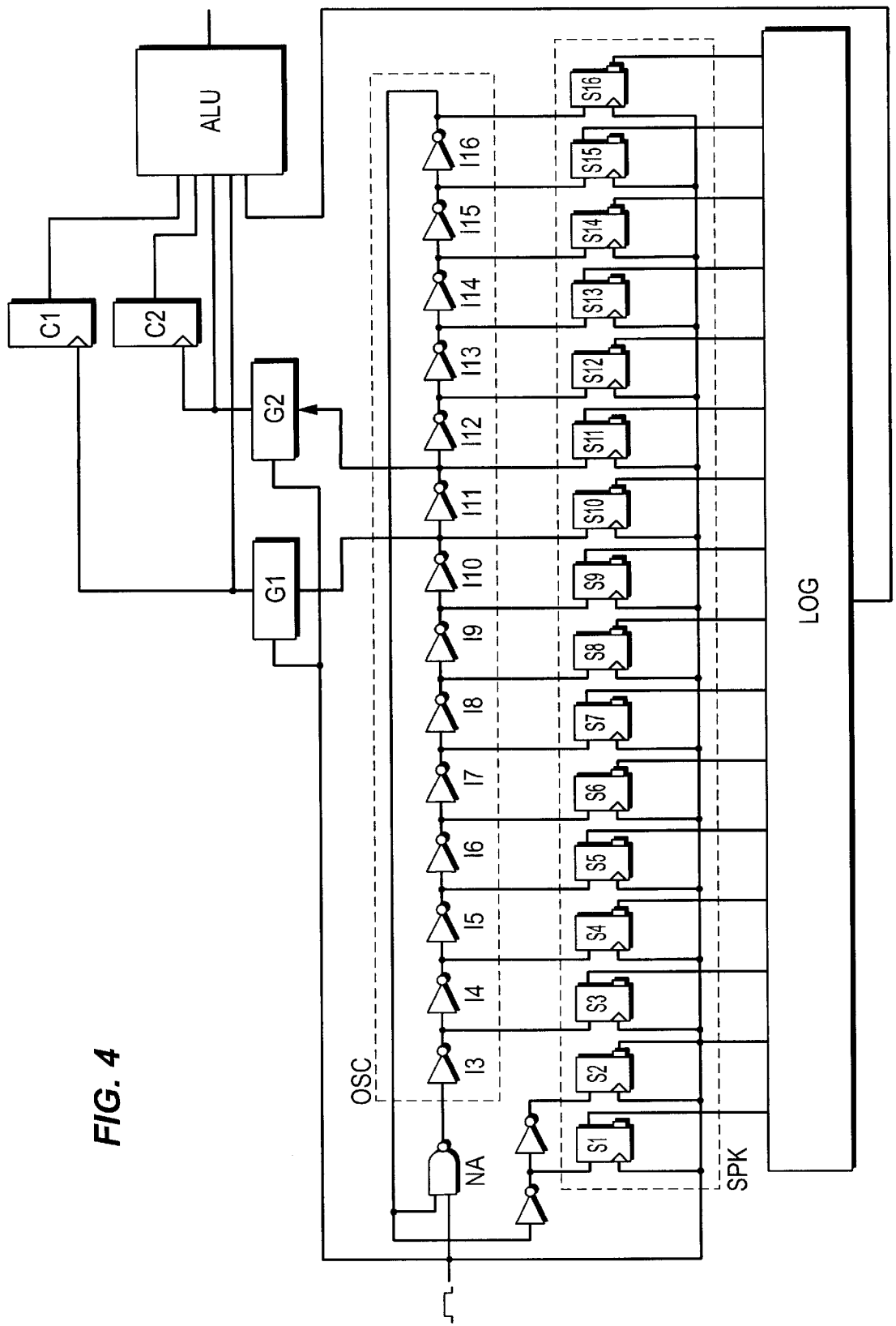
FIG. 4 shows a connection scheme of the measuring circuit (FIG. 1 of EPO 0508232A2)

As shown in FIG. 4, an electronic circuit for measuring a precise time interval which is present in the form of an electric measuring pulse comprises a ring oscillator (OSC) which comprises of a chain of series connected inverters (I3–I16). A controllable component consisting of a NAND-gate (NA) and two additional inverters (I1, I2) switches the ring oscillator (OSC) on or off, respectively. The complete clock periods thereof are counted in a first pulse counter (C1) and a second pulse counter (C2). A phase indicator consisting of a storage chain (SPK) and a scoring logic (LOG) records the phase position of the last clock period of the ring oscillator (OSC) in the moment when the ring oscillator is switched off. On the basis of the recorded phase position, an arithmetic-logic unit (ALU) decides which of the two pulse counters (C1) and (C2) contains the correct counting state and calculates the duration of the measuring pulse from the chosen counting state and the recorded phase position with a precision corresponding to the running time of an inverter.

One of the remarkable features of the circuit is an extremely high measuring precision around 200 pico seconds and this circuit can be inexpensively realized on a single integrated CMOS-switching circuit.

The invention relates to use of this electronic circuit for precisely measuring the time interval which is associated with the reflection of an electric measuring pulse, such as found with a magnetostrictive effect.

It is common practice in measuring the reflection of a current pulse using magnetostrictive effects to design devices for measuring a time difference from the input pulse to the output reflection as high-frequency counters or analogue circuits according to a "Dual slope"-method. If with this method short time intervals are to be measured with a high precision, correspondingly calibrated high counting frequencies are required in high-frequency counters. A desired precision of, e.g., 500 pico-seconds already requires a frequency of at least 2 gigahertz. Such calibrated high frequencies, however, can only be realized with the most rapid ECL-technologies, which is connected with a corresponding constructive effort, for example for the housing and for cooling, and thus results in a very expensive device.

Thus, the object of the present invention is to provide a device for measuring a time difference from an input pulse to receipt of its effect which is, as regards the circuit, designed inexpensively and with which short time intervals can be measured with high precision.

This object may be achieved by the application of the principles disclosed in the counter of EPO 0508232A2. This EPO application disclosed an electronic circuit comprising a ring oscillator having a chain of series connected inverters, a controllable logic component which switches the ring oscillator on or off in response to the measuring pulse representing the time interval, further at least one pulse counter which counts the number of the complete clock periods of the oscillating ring oscillator at one of the inverters, further a phase indicator which records the phase position of the ring oscillator in the moment when the ring oscillator is switched off and finally an arithmetic-logic unit connected with the pulse counter and the phase indicator, which outputs the measuring result as a multiple of the running time of an inverter on the basis of the recorded phase position and the counting state.

The core of the circuit is the controlled ring oscillator. This ring oscillator is started with the positive edge of the measuring pulse phased-synchronously to the measuring pulse and then oscillates with its own frequency which results from the running times of the series connected inverter steps as well as from their number.

The pulse counter counts the complete periods of the oscillating ring oscillator as long as the measuring pulse is applied. The trailing edge of the measuring pulse, which corresponds to the end of the time interval to be measured, switches off the ring oscillator via the controllable logic component. The phase position of the last clock period in the moment of the end of the measuring pulse is recorded with the provided phase indicator. Thus, in the pulse counter as well as in the phase indicator there are provided all necessary information for exactly determining the duration of the measuring pulse or the time interval to be measured, respectively, with a precision corresponding to the running time of an inverter.

The measuring precision of the suggested electronic device for measuring a time difference is determined by the running time of the used inverters. In modern ASICs in CMOS-technology today interval running times around 200 pico-seconds are realizable without any problems. Thus, the measuring circuit is by far superior to common high-frequency counters; moreover it can be manufactured very inexpensively on one single chip. Another advantage is the low current consumption of the circuit.

In order to guarantee a safe dying of the oscillation of the ring oscillator, the inverter chain must not be too short as otherwise the amplitude of the ring oscillator does not achieve the full height in the first periods, which could also lead to incorrect counting states in the pulse counters.

In the CMOS-technology here preferred, a NAND-gate presents itself as a logic component for switching the ring oscillator on and off. The running time of a NAND-component in the technology used here is approximately twice as long as the running time of an inverter step. Therefore, apart from the NAND-gate the controllable component comprises two additional inverters which subdivide the running time of the NAND-gate into two inverter running times.

In a preferred embodiment, the ring oscillator comprises 14 inverters. Together with the two additional inverters at the NAND-component there are altogether 16 series connected inverter steps, which is a power of two, so that the subsequent logic arithmetic operations are simplified.

The switching off of the ring oscillator effected by the end of the measuring pulse can be effected in any phase position of its clock. If there is only one pulse counter under unfavorable conditions, the end of the measuring pulse could fall just on a counting edge, and this would lead to setup/hold-time-defects which in turn could lead to the counting state to be incorrect. A fault of 1 would for example mean a measuring inaccuracy of 32 inverter running times when there are altogether 16 inverter steps. In an advantageous development of the circuit, there are therefore two parallel pulse counters provided which are each operated time-shifted by approximately half a clock period. Thus, it is guaranteed that always at least one of the two pulse counters is definedly switched off. Which counter contains the correct counting state after the ring oscillator is switched off is decided by the arithmetic-logic unit on the basis of the phase position of the ring oscillator recorded in the phase indicator. However, the circuit basically also works with only one pulse counter.

In order to operate the two pulse counters with counting clocks which are each time-shifted by half a clock period, they are preferredly connected with the outputs of two subsequent inverters.

A clock generator which is designed as a controllable divider precedes each of the two pulse counters. These clock generators have the function of converting the period clock of the ring oscillator which is sensed at the output of the respective inverter step into a counting pulse with a precisely known number of edges.

Preferably, the clock generators each comprise a flip-flop, the clock input of which is connected to the output of an inverter of the ring oscillator and the output of which acts on the input of the pertaining pulse counter, as well as a controllable inverter at the input of which the measuring pulse is applied and the output of which is connected to the data input of the flip-flop. An exclusive-or-component is used as controllable inverter which effects that. At the output of the flip-flop there is outputted a counting pulse with half a clock rate as long as the measuring pulse is applied at the input.

The running times which inevitably occur due to the exclusive-or-component can be compensated by a hold-up line with a respective running time which is preceding the clock input of the flip-flop.

The phase indicator preferably comprises a storage chain and a scoring logic. Here, the storage chain comprises as many storage elements as there are inverters, each storage element being assigned to exactly one inverter and storing the logic condition thereof at the moment when the ring oscillator is switched off. The pertaining scoring logic compresses the contents of the storage chain to a figure representing the phase position of the last clock period of the ring oscillator and in addition collects the logic condition of the first storage element. In the chain of storage elements the phase position of the last clock period of the ring oscillator is recorded at the moment when the ring oscillator is switched off by the trailing edge of the measuring pulse. On the basis of the thus "frozen up" last phase position and the logic value of the first storage element, it can be decided which of the two pulse counters contains the correct counting state.

Particularly preferred is an embodiment in which the storage elements of the storage chain are D-flip-flops, the data inputs of which are connected with the outputs of the pertaining inverters and at the clock inputs of which the measuring pulse is applied.

When the circuit is designed as an integrated CMOS-switch circuit so-called "matching effects" can be utilized, as all logic function components present on the chip have practically the same dynamic behavior. This results in a further increase of the precision of measurement or it is a basic precondition for highly precise measurements.

Figure 6:
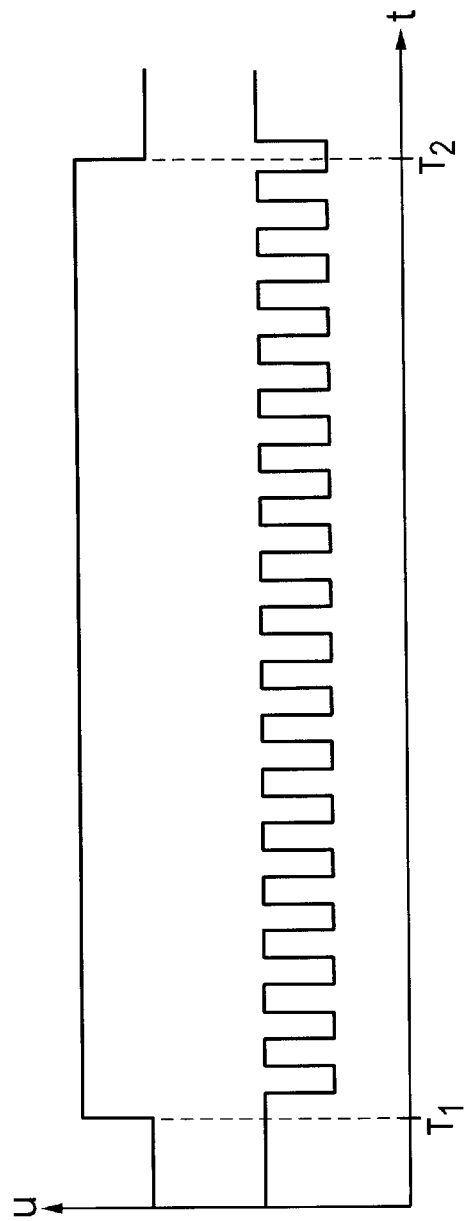
FIG. 6 shows the measuring pulse applied to the measuring circuit of FIG. 4 via the pertaining clock generators of the ring oscillator in a time-voltage-diagram (FIG. 3 of EPO 0508232A2).

The measuring circuit in FIG. 6 designed as an integrated CMOS-circuit substantially consists of a ring oscillator OSC, two pulse counters C1, C2 with pertaining clock generators G1, G2, a phase indicator consisting of a storage chain SPK and storage elements S1–S16 as well as an arithmetic-logic unit ALU.

The ring oscillator OSC is preceded by a NAND-gate NA as a controllable logic component, the running time of which is subdivided into two inverters I1, I2. At the input of the NAND-gate NA the measuring pulse, the duration which is to be measured, is applied. The NAND-gate NA precedes the chain of 14 inverters I3–I16 which are arranged in series.

Two pulse counters C1 and C2 are provided which are each preceded by a clock generator G1 or G2, respectively. The input of the clock generator G1 is connected with the output of the inverter I10, while the input of the second clock generator G2 is connected with the output of the subsequent inverter I11.

The storage chain SPK comprises 16 equal storage elements S1–S16 which are here designed as D-flip-flops, an inverter I1–I16 being assigned to each storage element S1–S16.

Figure 5:
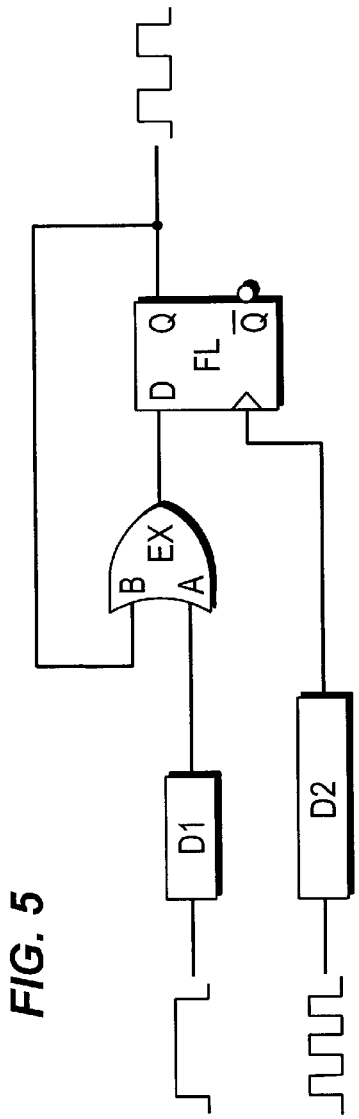
FIG. 5 shows a connection diagram of the clock generators used in the circuit according to FIG. 4 (FIG. 2 of EPO 0508232A2)

The clock generators G1 and G2 preceding each of the pulse counters C1 and C2 each contain a D-flip-flop FL and an exclusive-or-component EX according to FIG. 5. The clock input of the flip-flop FL is connected with the output of the corresponding inverter I10 or I11, respectively, of the ring oscillator OSC (cf. FIG. 4); its output Q directly acts on the pertaining pulse counter C1 or C2, respectively, which commonly consists of a chain of further D-flip-flops.

The exclusive-or component EX is used as a controllable inverter, the measuring pulse being applied to the one input A thereof, the other input B being connected to the output Q of the flip-flop FL, and the output of the inverter acts directly on the data input D of the flip-flop FL. For compensating the running time D1 on its way via the exclusive-or component EX to the data input D of the flip-flop FL, the clock input of the flip-flop FL is preceded by a correspondingly dimensioned hold-up line D2.

The measuring circuit works as follows:

With the rising edge of the measuring pulse, the duration of which is to be exactly determined, the ring oscillator OSC is started via the NAND-component NA phase-synchronously. The ring oscillator then oscillates with its own frequency which results from the running times of the inverters I1–I16 as well as their number, until the trailing edge of the measuring pulse switches it off again. FIG. 6 shows the clock periods of the ring oscillator OSC during the time interval $T_2-T_1$ which corresponds to the duration of the measuring pulse.

As long as the ring oscillator OSC is oscillating, the complete clock periods thereof are counted by the pulse counters C1 and C2. In the process, the clock signals tapped at the outputs of the inverters I10 or I11, respectively, of the ring oscillator OSC are converted into a counting signal with half the number of pulses or with the double pulse width in the preceding clock generators G1 and G2. In the process, the running time D1 of the measuring pulse is compensated up to the data input D of the flip-flop FL by the hold-up line D2 running in parallel to the clock signal in such a way that the measuring pulse and the clock signal arrive at the flip-flop FL phase-synchronously. The trailing edge of the measuring pulse switches off the clock generators G1 and G2—and thus the connected pulse counters C1, C2.

After the ring oscillator OSC is switched off in response to the negative edge of the measuring pulse, the present condition of the inverter chain, which represents the phase position of the last clock period, is transmitted to the storage elements S1–S16 of the storage chain SPK which are assigned to each inverter I1–I16. The scoring-logic LOG compresses the contents of the storage chain SPK to a five-bit-figure which indicates at which phase position the ring oscillator OSC was switched off.

On the basis of the information about the phase position provided by the scoring-logic LOG, the arithmetic-logic unit ALU can now check which of the two pulse counters C1 and C2 has been switched off under defined conditions. The arithmetic-logic unit ALU finally calculates from the counting state of the chosen pulse counters C1 or C2, respectively, and the recorded phase position at the point of switching off the ring oscillator as well as from the logic condition of the first storage element S1, the measuring result in the form of a figure which indicates the duration of the measuring pulse as a multiple of the running time of one of the inverters I1–I16.

The duration of the time interval $T_2-T_2$ thus determined up to a running time of one inverter between a rising and a trailing edge of the measuring pulse can subsequently be further processed.

As the running times of the inverters are not the same in every chip and are moreover subject to variations in temperature and voltage, it is necessary to carry out calibrations before the measuring circuit is initiated and when the measuring circuit is operated. This can for example be done by applying two measuring pulses of a known duration to the measuring circuit and obtaining a calibration curve by simple arithmetic, with the help of which the later measuring results can be converted into time differences. The arithmetic required for doing this can be realized by processors of a simple construction.

List of reference numerals:
OSC ring oscillator
NA NAND-gate
I1–I16 inverters
C1, C2 pulse counters
G1, G2 clock generators
FL flip-flop (of G1, G2)
D data input (of FL)
Q output (of FL)
EX exclusive-or-component (of G1, G2)
A, B inputs (of EX)
D1 running time
D2 hold-up line
SPK storage chain
S1–S16 storage elements
LOG scoring logic
ALU arithmetic-logic unit The basic principles of European Application 0508232A2 are in the SARA system as described and shown herein in connection with the timing system of the present invention. The timing system of the present invention uses a course conventional clock and a fine clock as described in this European Application incorporated above.

SARA System Operation

For measuring displacements of a measuring magnet of a magnetostrictive device, the SARA system 12 generates an interrogation or start pulse and receives a magnet signal returning from the magnetostrictive device 14. The magnet signal is compared in computer 30 to a threshold voltage to form a stop pulse in SARA 12, as is well known in the art. The SARA system 12 then measures the time period between the start pulse and the stop pulse in a time measurement unit 48. The SARA system 12 then multiplies the time period by a scale factor stored in registers 44 and writes a result representing the time period to four (4) 8-bit registers 50.

Then, the SARA system 12 switches an INT\ output 52 to its low state which signals the microcontroller 16 that valid data is available for reading. The result representing the time period is then transferred to the $\mu$C 16 in four (4) read cycles on one address. With the transfer of the last read cycle, the SARA system 12 clears an interrupt and is prepared to receive additional magnet signals to form the next stop pulse from the computer 30 (for multi magnet applications, such as shown in U.S. application Ser. No. 08/564,863, filed Nov. 30, 1995, entitled Magnetostrictive Position Sensing Probe with Waveguide Referenced to Tip, the specification and drawings of which are incorporated herein by reference). This procedure allows a fast transfer of the result into the $\mu$C 16. The $\mu$C 16 then converts the transferred data into a format that the interface 20 needs (e.g., converts the data into RS485 format).

All results can be and generally are corrected by reference measurements. The unscaled results are 28 bit wide, where the 16 higher bits representing the number of full MK clock periods, the coarse clock, and the 12 lower bits representing a fraction of a full MK clock period. Using the recommended 4 MHz for an MK clock, the least bit means or corresponds to a 61 ps (pico second) time period. The true resolution of the SARA system 12 of this invention is typically about 280 ps to about 180 ps, depending on temperature and supply voltage. Only cyclic reading for fast downloading of the results is also provided to permit the reading of four registers 50 at one address by using an internal counter to multiplex the address (calculated from the original data course and fine counters 51). All functions are controlled using registers 38,40,42,44,46 which are connected to an 8-bit $\mu$C interface 54. The SARA system 12 offers two modes for the planed position and temperature measuring:

everyone (the $\mu$C must be fast enough to read before new results come in) which can be as many as placed on the system.

one addressable position (1 of 16) or 8 temperature ports for (RTD) port no. (1 of 8)

The SARA system 12 is designed to be operated in a continuous measuring mode. The SARA system 12 is able to generate and transmit or send an interrogation pulse having a programmable length of up to 255 MK clock periods if the startout pin is connected to the startin pin. The SARA system 12 is also designed to operate in an external start mode where the time measurement will start either with the interrogation pulse or an incoming pulse (ref. magnet) either one coming from the startin pin disconnected from the startout pin.

Two 16 bit registers for programming a High Noise Rejection Window 42a, 42b, and cycle time 38a, 38b. The window is a lower value, and will enable the stopin after the internal counter (internal to SARA) has counted out the cycle time 38a, 38b, has reached the value of the window 42a, 42b and μC can adjust window 42a, 42b from one reading to the next depending on the location of the magnet (s) in the magnetostrictive device. Every measurement includes a scaling 44 with a 24 bit value, made by the internal high speed ALU (internal to SARA). Interrupts 52 and one bit change in the status register 53 will be generated when new results are available. The cycle time 38a, 38b is reached or an overflow (temperature measurement only for fixed high value) error occurs. Interrupts will be cleared by reading the result register 50 four times, or the interrupt clear register through I/O port 54.

The SARA system 12 includes a control unit 36 which is a state machine programmed for the desired sequence of events as necessary to operate the particular magnetostrictive position sensor 14, reads the discharging times for temperature and processes a result from those measurements. The 8 bit control register 46 stores control information that comes in from a bus 54. The 8 bit length register 40 stores the desired pulse width of the interrogation pulse. The cycle time high and low registers 38a–b store 16 bit information for the rate at which the interrogation sequence repeats. The high and low HNR (high noise rejection) registers 42a–b store 16 bit information for a time window around the expected termination of the measured time interval. Any pulses occurring outside of the window are rejected as described more fully in U.S. Pat. No. 4,721,902.

The I/O interface bus, or port, 54 is a μController interface, preferably based on the Intel μC family of controller interfaces, available from the Intel Corporation. It is used for bi-directional communication with an external microprocessor (not shown) as needed. The time measurement unit 48 determines a 28 bit result stored in the result registers 50 for the magnet position from the duration of the time period between the start pulse and the stop pulse. If the scale factor is 1.0, then the 16 higher bits of the result are the count of fill periods of an internal (or external) crystal controlled coarse clock 56 such as MK clock which determines a coarse count. The 12 lower bits of the result are derived from a pulsed (oscillator) ring counter or fine clock 58 of a type described above which determines a fine count. The time measurement unit 48 also includes three 8 bit registers 44 to store the 24 bit scaling factor.

The scaling factor is used to determine the number of inches (centimeters) a bit represents, e.g., assume the crystal clock operates at 2 MHz, the speed of sound in the waveguide is 9.05125 μs per inch, and an output scaling of 0.013487 inches per bit is desired, then the scaling factor would be 01B9EDh which would mean that a measurement count of 000186A0h would be stored as 100.000 inches after scaling.

The result registers 50 comprise four 8 bit registers which are used to store the total count which represents the magnet position.

The μController 54 also contributes to the measuring efficiency of the SARA by varying the threshold voltage of the comparator 30 so that the signal from the sending element (distant magnet) is maintained at an easily measured value. The μController 54 performs this task by using an EPOT (electron potentiometer) 60 to vary the voltage as the magnet or sending element gets further away from the source. Additionally, the EPOT control mechanism can be used to vary the signal with time and to adjust and maintain the signal strength.

The μController 54 may include an EPOT with control logic that controls the EPOT as executed by the μController as shown in Ser. No. 08/549,491, filed Oct. 27, 1995, entitled Pulse Detector by David Nyce, the specification and drawings of which are incorporated by reference herein.

Additionally as shown in FIG. 2, temperature measurements are determined by a temperature measurement unit 62 which uses the time measurement unit 48 and resulting time period to determine the temperature of the RTD 34. The temperature measurement unit 62 is detailed in FIG. 3, which shows that temperature measurement unit 62 includes a capacitor $C_0$ 64 which is discharged over the temperature sensing RTDs 34, an SNS or a Schmitt trigger input 66 which is connected to the capacitor 64, and a transistor 68. When the voltage reaches the threshold voltage of the SNS input 66, the time measurement is stopped and a CHA output 70 switches from high impedance to low, so that the capacitor 64 is recharged.

The discharge time or time period to be measured depends on the resistance of each RTD 34 and switching transistors 68, a supply voltage, the capacitor 64 and the threshold voltage of the SNS input 66. By using reference resistors 32, 78, it is possible to eliminate these influences (except the influence of the RTD). The SARA system 12 measures the time between start and stop pulses, or for discharging a capacitor to a threshold voltage.

Figure 3:
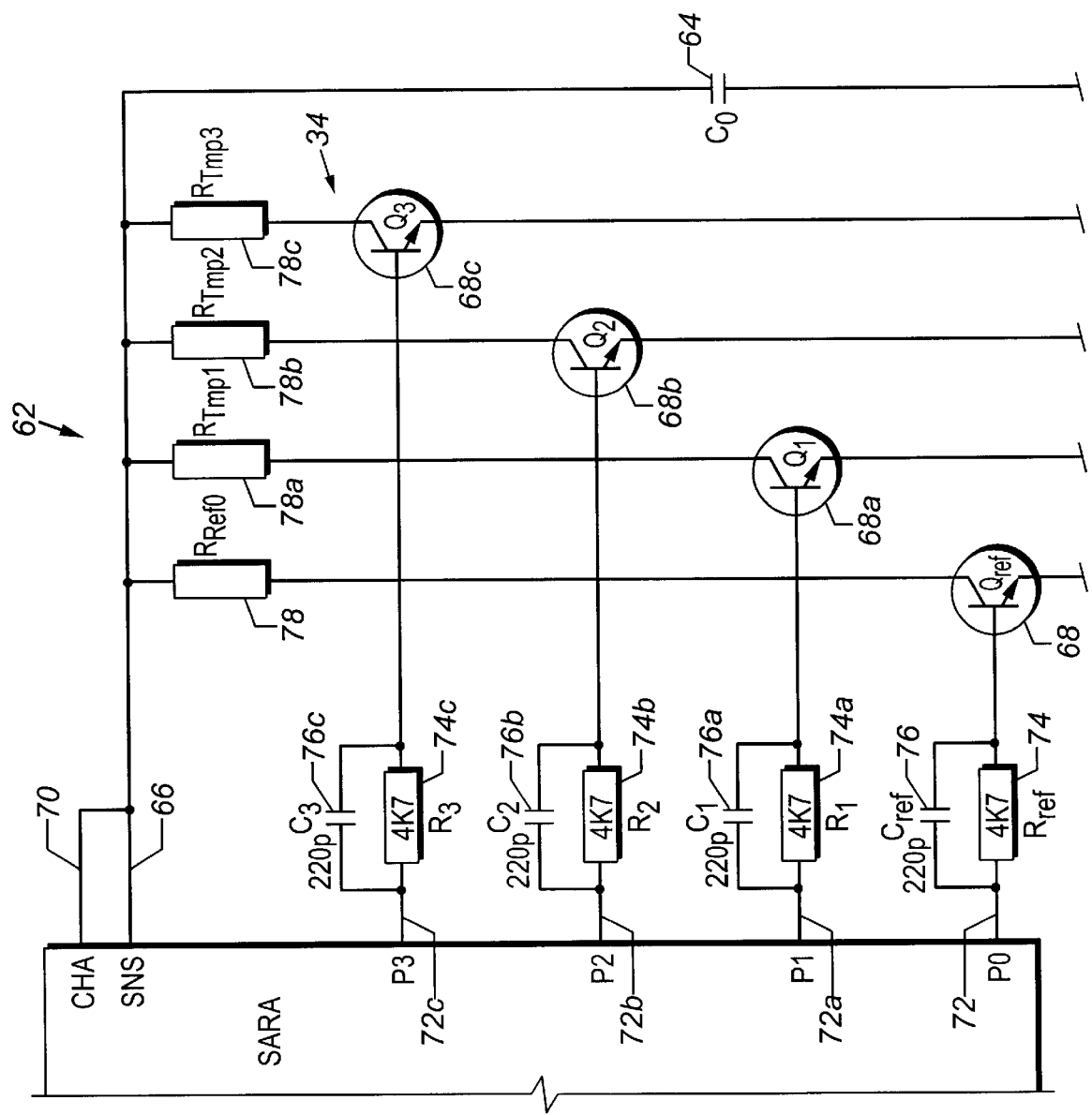
FIG. 3 is a schematic diagram of a temperature measurement unit with three RTDs and one reference.

The temperature measurement unit 62 as shown in FIG. 3 translates a resistance into a time period. This allows measurement of the RTDs 34 or other resistances. In operation, the charge or CHA pin 68 charges up the measurement capacitor $C_0$ 64 to the power supply voltage. Then, the charge pin 68 will disconnect. A port $P_0$ 72 turns on a transistor $Q_{Ref}$ 68 through a current limiter $R_{Ref}$ 74 and a speed up capacitor $C_{Ref}$ 76. This discharges the capacitor $C_0$ 64 through the resistor $R_{Ref1}$ 78 to be measured. The sense or SNS pin 66 senses when the capacitor $C_0$ 64 becomes discharged to a certain threshold voltage. The time period between turning on the port $P_0$ 72 and when the capacitor $C_0$ 64 is discharged is the time period that proportional to the resistance of the resistor $R_{Ref1}$ 78. This time period is stored, and the same operation is repeated for each resistance to be measured, e.g., a port $P_1$ 72a, a resistor $R_1$ 74a, a speed up capacitor $C_1$ 76a, a transistor $Q_1$ 68a, are used to measure a resistance of a resistor $R_{Tmp1}$ 78a, etc. The resulting time periods are measured in the same way as described for FIG. 2 for measurement of the position magnet. When all the measurements are completed, the temperature measurements ($R_{Tmp1}$ through $R_{Tmp3}$) are scaled by the measurement of the resistor $R_{Ref}$ 74. The resistor $R_{Ref}$ 74 is a precision resistor with a very low temperature coefficient and is used as a resistance reference.

The SARA system 12 was developed for measuring running periods and discharging times to calculate levels and temperatures, e.g., ASIC. The SARA system 12 is a CMOS-Sea-of-Gates-Chip, and runs on 3.3 volts. To reach the highest possible accuracy, the SARA system 12 needs a big buffer capacity on every supply pin (CX61–CX64).

As stated above, temperatures are determined by a resistance relation calculation based on the discharging times of reference resistors and a Pt1000 80 (RTD Platinum 1000 Ohms). As described above, a capacitor is charged by a charge or CHA output 70 and switches the CHA output 70 off (high impedance) and a port output to become high, so that the capacitor is discharged over a resistor and a transistor. Inside the SARA system 12 the time measurement is started. If the voltage of a capacitor reaches the threshold voltage of a schmitt-trigger or SNS input 66 (or the external comparator 30 which is connected to the SNS input 66), the time measurement is stopped and the CHA output becomes high again to charge the capacitor for the next measurement. The SARA system 12 has two modes for the temperature measurement:

the discharge time of one resistor (port) is measured the discharge time of port 0 up to port x is measured one after the other To calculate the unknown resistor (Rtmp), the value of the reference resistor is multiplied by the ratio of the discharge times of Rtmp and Rref To have a higher accuracy, the following algorithm to calculate the temperature is used: The multiple mode is used to measure the discharge times of port 0 up to port 6. The discharge times of 256 of such measurements are added, so that for each port a sum of 256 measurements is stored in the µController. Two ports measure reference resistors, the other ports are for the RTDs (Pt1000), which have a resistance of ca. 1000Ω at 0°. The reference resistors have known resistances of 1000Ω and 2000Ω. The difference of the sums of Rref2 and Rref1 (Sdiff=Sret2–Sref1) is used as a 1000Ω reference. Because of delay times, for example, the time to switch the transistor Q1, contain all values and offset Toff. The transient offset Toff is measured every measurement so that the delay time can ultimately be factored out of the measured time. By calculating the difference Sdiff, the offset Toff is dropped. The sum of the 1000Ω resistor Sref1 contains the offset, so that the offset itself can be calculated with Toff=Sref1–Sdiff. Toff is subtracted from all sums of the RIDs. These corrected sums are linear to the resistors of the RTDs. To obtain their resistance they are divided by the 1000Ω reference Sdiff. The resistance of a Pt1000 is almost linear to the temperature, so that a linear equation can be used to calculate the temperature from the resistance. The delay time Toff is not exactly the same time for each port. To eliminate this error, the delay time can be determined individually for every port and then stored in the EEPROM to use it for the calculation.

The resistance of the Pt1000 is not exactly linear to the temperature, and they have variations from piece to piece in the absolute resistance, but they have the same temperature coefficient. This can also be considered in the calculations, by adjusting for the slight nonlinearity, as shown in reference manuals for Pt1000.

Thus, the SARA system 12 yields a method to increase the resolution of measurement of a time period for a given frequency of precision oscillator in a position sensor, without requiring averaging or summing of several time periods to obtain said increased resolution. It includes:

a precision oscillator first means for providing a coarse count for the more significant bits of the time measurement, a high frequency oscillator second means for providing a fine count for the less significant bits of the time measurement, a register for storing coarse and fine counts from said first and second means, said register containing the complete high resolution measurement of the time period representing the position measurement or other measurement by time for use to determine the value of a physical variable such as time or resistance.

The precision oscillator is crystal controlled. The high frequency oscillator may be a ring oscillator.

A complete set of coarse and fine counts is obtained as the result of supplying as few as one excitation pulse to the waveguide.

The interrogation pulse for excitation of the waveguide has a programmable length. For measuring resistance in conjunction with a position sensor, the charging of a capacitor, the measuring of the time required to discharge to a threshold voltage said capacitor and control circuitry to cause said charge and discharge to occur is used and the resistance to be measured changes in response to temperature changes, and this change in resistance is used to measure temperature.

Control circuitry is used to multiplex among more than one resistance to be measured, and at least one of such resistances is a stable resistance for use as a calibration reference.

For position sensing, a raw count represents the position measured and storing also a scaling factor for scaling the raw count to desired units.

The sensor for position sensing also has a window in time surrounding the time during which a return pulse is expected to arrive, said window defining a time period outside of which signals will not be accepted by the receiving circuitry, said window timing derived by using the contents of a coarse count register and subtracting the desired number of counts.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

We claim:

1. A method for measuring a time interval corresponding to a position of a magnet associated with a magnetostrictive device, the method comprising the steps of:

a. generating a start pulse from a SARA system;

b. transmitting the start pulse to the magnetostrictive device;

c. receiving at the SARA System an input signal from the magnetostrictive device;

d. comparing said input signal to a threshold voltage to form a stop pulse;

e. storing a coarse count generated by a coarse clock and a fine count generated by a fine clock at the occurrence of the stop pulse;

f. adding the coarse count and fine count to form a resultant time interval having a resolution of less than about 280 ps; and g. converting the interval into the position of the magnet associated with the magnetostrictive device.

2. The method of claim 1, wherein said SARA runs in a continuous manner.

3. The method of claim 1, wherein said SARA commences with an external source.

4. The method of claim 1, wherein noise is rejected by high noise rejection windows upon receipt of said input signal.

5. The method of claim 1 wherein said resultant time interval is adjusted by a scaling factor.

6. The method of claim 1, wherein there are included multiple magnets, and step c includes the input signal being received from each of the magnets through the magnetostrictive device, and steps d–g calculate the position of each magnet.

7. The method of claim 1, wherein voltage of the start pulse is varied by distance of the magnet associated with the magnetostrictive device from the source of the start pulse.

8. An apparatus for measuring time intervals corresponding to a position of a magnet associated with a magnetostrictive device, comprising:

a. a sensor advanced running period acquisition system which includes a course clock and a fine clock;

b. a pulse generator connected to said acquisition system and having means responsive to said acquisition system for the magnet via the magnetostrictive device for generating a start pulse and receiving a return pulse from the magnetostrictive device corresponding to the position of the magnet;

c. a comparator for comparing said return pulse to a threshold voltage to generate a stop pulse for said clocks, said comparator connected to said acquisition system and the magnetostrictive device;

d. said acquisition system having counters to accumulate a course count from said course clock and a fine count from said fine clock on initiation of said start pulse, said counters terminating accumulation when said stop pulse is received by said acquisition system;

e. a microcomputer, said microcomputer determines a time interval corresponding to the position of the magnet, including adding the coarse count to the fine count; and wherein said acquisition system includes a scaling factor and includes means for scaling said time interval by a scaling factor.

9. An apparatus for measuring time intervals corresponding to a position of a magnet associated with a magnetostrictive device, comprising:

a. a sensor advanced running period acquisition system which includes a course clock and a fine clock;

b. a pulse generator connected to said acquisition system and having means responsive to said acquisition system for the magnet via the magnetostrictive device for generating a start pulse and receiving a return pulse from the magnetostrictive device corresponding to the position of the magnet;

c. a comparator for comparing said return pulse to a threshold voltage to generate a stop pulse for said clocks, said comparator connected to said acquisition system and the magnetostrictive device;

d. said acquisition system having counters to accumulate a course count from said course clock and a fine count from said fine clock on initiation of said start pulse, said counters terminating accumulation when said stop pulse is received by said acquisition system;

e. a microcomputer, said microcomputer determines a time interval corresponding to the position of the magnet, including adding the coarse count to the fine count; and wherein there are multiple magnets on said magnetostrictive device and said pulse generator receives a return pulse corresponding to the position of each of the magnets, said acquisition system adapted to receive multiple stop pulses from said comparator and having means to accumulate the time interval to each of the magnets, adding corresponding course counts to fine counts.

10. An apparatus for measuring time intervals corresponding to a position of a magnet associated with a magnetostrictive device, comprising:

a. a sensor advanced running period acquisition system which includes a course clock and a fine clock;

b. a pulse generator connected to said acquisition system and having means responsive to said acquisition system for the magnet via the magnetostrictive device for generating a start pulse and receiving a return pulse from the magnetostrictive device corresponding to the position of the magnet;

c. a comparator for comparing said return pulse to a threshold voltage to generate a stop pulse for said clocks, said comparator connected to said acquisition system and the magnetostrictive device;

d. said acquisition system having counters to accumulate a course count from said course clock and a fine count from said fine clock on initiation of said start pulse, said counters terminating accumulation when said stop pulse is received by said acquisition system;

e. a microcomputer, said microcomputer determines a time interval corresponding to the position of the magnet, including adding the coarse count to the fine count; and wherein there is further included an adaptive device, said adaptive device varying the voltage of said start pulse based on distance of the magnet along the magnetostrictive device.

* * * * *